Nov. 5, 1968     M. J. KLYGIS     3,409,710
METHOD OF MOLDING DUAL WALL CONTAINER AND CLOSURE
Filed Jan. 19, 1965

INVENTOR
MINDAUGAS J. KLYGIS
BY Mason, Porter, Diller & Brown
ATTORNEYS

United States Patent Office 3,409,710
Patented Nov. 5, 1968

3,409,710
METHOD OF MOLDING DUAL WALL
CONTAINER AND CLOSURE
Mindaugas J. Klygis, Chicago, Ill., assignor to Continental
Can Company, Inc., New York, N.Y., a corporation
of New York
Filed Jan. 19, 1965, Ser. No. 426,558
9 Claims. (Cl. 264—98)

This invention generally relates to the art of forming hollow articles by the expansion of tubing within a mold and primarily seeks to provide a novel method for forming hollow articles of a dual wall construction wherein a portion of one of the walls forms a neck of the container and a portion of another wall forms a closure portion which is removable from the neck portion and is adapted for re-application to the neck portion for reclosing the dual walled articles.

At the present time, hollow articles, such as plastic bottles are formed from a continuously extruded tube of a generally constant wall thickness. As the tube is extruded it is gripped by molds, and sections of the tube are isolated and sealed at their ends, after which, fluid under pressure is introduced into the isolated sections to expand the tube to conform to the shape of the mold cavity. Such hollow articles are generally provided with necks which are closed when the sections of the tube are sealed by the molds. This sealed portion of the tube adjacent the neck must be removed by a severing operation to open the neck and form the opening or mouth of the bottle.

Closures are generally provided for such hollow articles by any one of a variety of different methods which generally bear little relationship to the formation of the hollow articles except for the fact that the closures are designed to complement the necks of the hollow articles. For example, the closures associated with externally threaded necks of bottles are provided with internal threads which complement the threads of the bottle necks, and except for this complementary relationship between the bottle necks and the closures, there need be little if any relationship between the method by which the bottles are manufactured and the method by which the closures are manufactured.

It is therefore an object of this invention to provide a novel method of producing hollow articles, such as bottles, of a dual wall construction and simultaneously therewith, form closures for such dual wall articles or containers by simultaneously extruding coaxial tubular members, confining the members in a mold, expanding the members to the configuration of the mold to form coaxial container bodies terminating in closure and neck portions, removing the container from the mold, and removing the closure portion by a severing operation thereby simultaneously forming both a container and a closure portion therefor.

A further object of this invention is to provide a novel method of simultaneously producing dual wall containers and closures comprising the steps of extruding an outer tubular plastic member, simultaneously extruding an inner tubular plastic member coaxial with the outer tubular member, confiningly expanding both members to form a dual wall container terminating in closure and neck portions, simultaneously forming complementary locking portions in each of the closure and neck portions, and removing the closure portion of the outer member from the neck portion of the inner member by peripherally severing the latter closure portion and disengaging the locking portion thereof from the locking portion of the neck portion of the inner member.

A further object of this invention is to provide a novel method of producing a dual wall container including each of the steps immediately above described, and in addition, including the steps of forming an axial opening in an end wall of the removed closure portion, and thereafter securing a disc-like member to the closure portion to close the opennig in the closure portion.

A further object of this invention is to provide a novel method of producing a dual wall container and closure comprising the steps of forming a pair of coaxial tubular members, contouring a portion of one of the members to form a closure portion, contouring a portion of another of the members to form a neck portion and removing the closure portion from the remainder of the one member whereby the closure portion is adapted for re-application upon the neck portion of the other tubular member after having been once removed therefrom.

With the above, and other objects in view that will hereinafter appear, the nature of the invention will be more clearly understood by reference to the following detailed description, the appended claims and the several views illustrated in the accompanying drawing.

Figure 1:
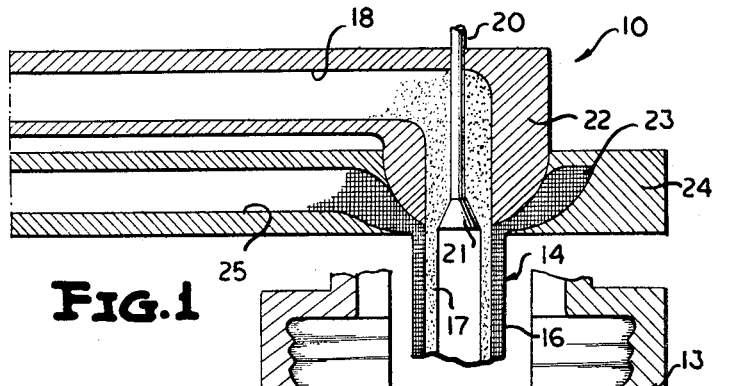
FIGURE 1 is a fragmentary sectional schematic view of an extrusion head and a split mold, and illustrates the extrusion of a pair of coaxial plastic members and the introduction thereof into the split mold.

In the example embodiment of the invention illustrated herein, a coaxial extrusion die 10 is used in conjunction with a pair of conventional extruding machines or extruders (not shown) for forming dual wall hollow articles from coaxial tubes, tubing or tubular members. In such machines, a plurality of molds, such as a split mold 11, are mounted on a common shaft and are rotated in a common plane. Each of the molds is formed in halves 12 and 13 which are opened to receive an extruded coaxial tube 14. The coaxial tube 14 is continuously extruded by the extruders with the mold halves 12, 13 passing on opposite sides of the extrusion die 10.

As the mold halves 12, 13 close, they close about a portion of the coaxial tube 14 and the molds are so designed that they pinch the tube so as to seal off opposite ends of the section disposed within the mold 11. As the mold halves 12, 13 grip the tube, an injection needle passes through the tube and once the mold halves have completely closed and seal the opposite ends of the tube sections, fluid preferably air under pressure, is introduced into the tube with the result that the tube is internally expanded and assumes the shape of a cavity 15 in each of the mold halves 12, 13.

The particular material forming an outer tube 16 of the coaxial tube 14 may vary, but is preferably polystyrene or similar plastic material which is relatively rigid upon setting while an inner tube 17 of the coaxial tube 14 is preferably constructed from polyethylene or similar plastic material which is relatively flexible.

The material forming the inner tube 17 of the coaxial tube 14 is fed from one of the extruders through an extension or conduit 18 which is preferably heavily insulated or heated in a conventional manner to maintain the extruded material in a plasticized state. A conventional adjustable metering member or valve 20 having a head 21 is mounted in an offset portion 22 of the extension 18.

The offset portion 22 is received in a chamber 23 of a head 24 forming a portion of a conduit or extension 25 of another extruder. The polystyrene extruded through the conduit 25 is similarly maintained in a plasticized state by suitably heating the conduit 25 or insulating the same thereby urging the plasticized polystyrene outwardly of the chamber 23 to form the outer tube 16 coaxial with the inner tube 17 in a manner clearly illustrated in FIGURE 1 of the drawings.

Figure 2:
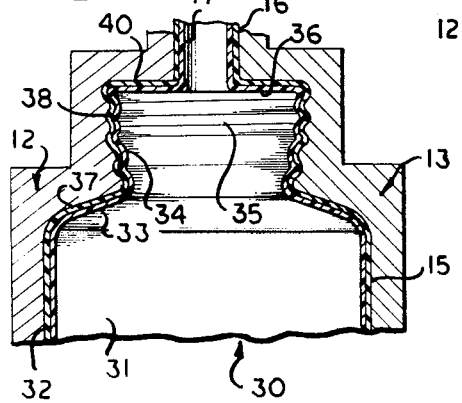
FIGURE 2 is a fragmentary schematic sectional view of the split mold of FIGURE 1, and illustrates the expansion of the tubular members to conform to the shape of the mold cavity.

After the coaxial tube 14 has been formed and the split mold halves 12 and 13 of the mold 11 close in the conventional manner heretofore described, air is introduced into the interior of the inner tubular member 17 to expand both members to the general contoured configuration of the cavity 15 in the manner clearly illustrated in FIGURE 2 of the drawings.

This expansion or blow-molding of the coaxial tube 14 forms a dual wall container 30 which is closed at axial end portions thereof (not shown) at the points where the coaxial tube 14 is gripped and sealed by the closed mold sections 12 and 13.

The dual wall container 30 comprises a pair of substantially identical container bodies 31 and 32. The container body 31 includes an annular shoulder portion 33 and an upstanding neck 34 which is threaded at 35. The upstanding neck 34 terminates in an end portion 36 adjacent an upper end portion of the inner tubular member 17.

The container body 32 is formed from the material of the outer tubular member 16 and similarly includes an annular shoulder 37 integrally joined to an internally threaded closure portion 38 which overlies and complements the threaded neck portion 34 of the inner coaxial container body 31. The closure portion 38 terminates in an end portion 40 adjacent the upper end portion of the outer tubular member 16.

Figure 3:
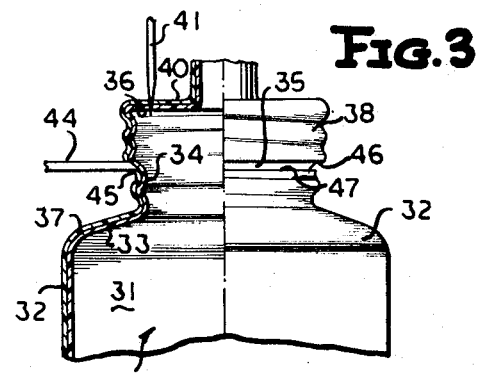
FIGURE 3 is a fragmentary elevational view with a part shown in section, and illustrates the selected severing of two portions of a dual wall container formed from the pair of coaxial tubular plastic members to form a closure portion having an axial opening in an end wall thereof.
Figure 4:
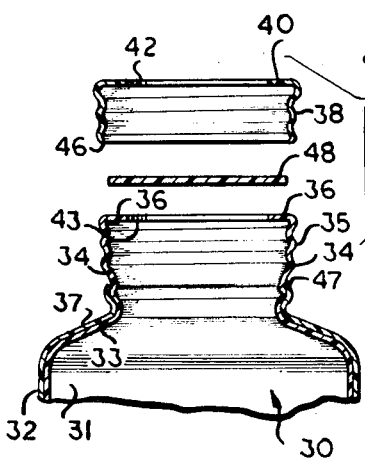
FIGURE 4 is a fragmentary exploded sectional view of the dual wall container of FIGURE 3 after the closure portion has been severed and removed, and illustrates the disc for closing the axial opening of the closure portion.

After the sections 12 and 13 of the mold 11 have been opened, the dual wall container 30 is removed therefrom and portions of the end portions 36 and 40 are removed by a conventional severing operation, as is best illustrated in FIGURE 3 of the drawing. In this case, a relatively sharp knife edge 41 is introduced through both of the end portions 36 and 40 and the dual wall container 30 is rotated in a conventional manner about its own axis to cut respective openings 42 and 43 in the closure portion 38 and the neck portion 34 of the respective container bodies 32 and 31 (FIGURE 4). Simultaneously with the formation of the axial openings 42 and 43, a cutting tool 44 having a contoured cutting edge 45 (FIGURE 3) is advanced in a direction substantially normal to the axis of the dual wall container 30 adjacent the shoulder 37 of the container body 32 to remove a narrow peripheral band of material (not shown) from the material of only the closure portion 38. No severing of the neck portion 34 of the inner container body 31 occurs, as is clearly shown in FIGURE 3 of the drawings. This peripheral severing or removal of material by the tool 44 forms a terminal peripheral edge 46 (FIGURE 3) of the closure portion 38 and an opposing upper terminal edge 47 on the outer container body 32. The removal of this peripheral band of material frees the closure portion 38 from the remainder of the outer container body 32 and by merely rotating the closure 38, the same is removed from the threaded neck portion 34 of the inner container body 31, as is shown in FIGURE 4 of the drawing.

Figure 5:
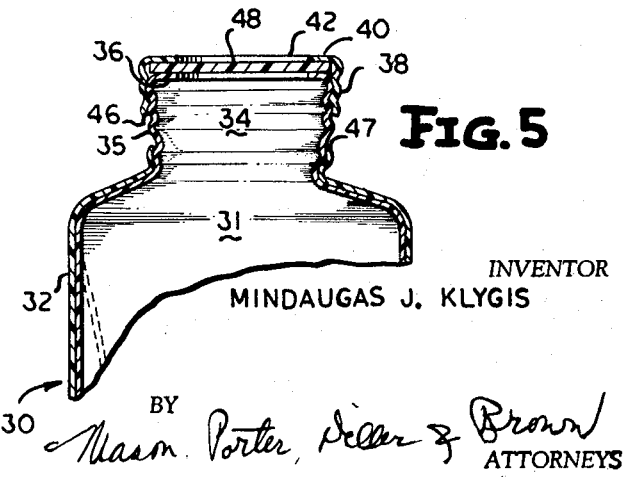
FIGURE 5 is a fragmentary sectional view of the dual wall container of FIGURE 4, and illustrates the various components of the dual wall container in their assembled condition.

After the closure portion 38 has been removed from the neck portion 34 of the dual container 30, a circular disc 48 of plastic material, such as polystyrene, is secured in the interior of the closure portion 38 to the remaining portion of the end wall 40 in any conventional manner, such as, for example, by a heating sealing operation, to close the opening 42 in the closure 38, as is shown in FIGURE 5 of the drawing. The closure portion 38 with the disc 48 can now be re-applied to the neck portion 34 of the dual wall container 30 to close the opening or mouth 43 in the neck portion 34 in the manner clearly illustrated in FIGURE 5.

The dual wall container 30 of FIGURE 5 is particularly adapted for packaging vacuum-filled products. To this end the outer container body 32 is constructed from relatively rigid polystyrene material, as has been heretofore noted, which prevents the collapsing of the dual wall container 30 when a vacuum is drawn during a conventional vacuum-filling operation. Therefore, even though the relatively flexible polyethylene material of the inner container body or lining 31 tends to bow radially inwardly when air is evacuated from the container 30, as shown in phantom outline in FIGURE 5, the outer rigid container body 32 maintains the rigidity of the dual wall container 30 and prevents the collapsing thereof.

It will also be readily apparent that the opening 42 in the closure portion 38 can be closed without removing the closure portion 38 from the neck portion 34 of the dual wall container 30. That is, after the openings 42 and 43 have been formed in the manner described in the consideration of FIGURE 3, and the narrow peripheral band of material has been removed from the closure portion 38, the container 30 can be filled by introducing a product directly through both openings 42 and 43 and thereafter securing the disc member 48 to the top of the remaining end wall portion 40. This, of course, would not require the removal of the closure portion 38 prior to the filling operation and provides an advantageous and economical method of packaging a product in the container 30.

While the dual wall container 30 is preferably constructed with a flexible inner container body 31 and a more rigid outer container body 32, this construction can be reversed to form the outer container body 32 of a less rigid and more flexible nature than the inner container body 31, by merely extruding the polyethylene and the polystyrene through the respective extruder extensions 25 and 18 of the extrusion die 10 and blow-molding the thus formed coaxial tubular member in the mold cavity 15 of the mold 11 in the manner heretofore described.

It is also considered within the scope of this invention to remove the entire end wall portions 36 and 40 of the respective container bodies 31 and 32 and peripherally sever the neck portion 34 of the inner container body 31 in a manner identical to the peripheral severing of the closure portion 38 of the outer container body 32. This construction would transform the neck portion 34 of the container body 31 into a removable externally threaded closure portion to which a disc, such as the disc 48, can be secured. In this case, the closure portion 38 would function as a neck portion to receive the externally threaded closure portion formed from the neck portion 34 of the inner container body 31. Therefore, while the portion 38 of the outer container body 32 has been specifically described as a closure portion and the portion 34 of the inner container body 31 has been described as a neck portion, it is to be understood that the neck portion 34 can be constructed as a closure member when peripherally severed in the manner heretofore described while the closure portion 38 would function as the neck of the dual wall container 30.

While the closure portion 38 and the neck portion 34 of the container 30 are complementary threaded to form the locking means for threadably securing the closure to the container as shown in FIGURE 5, it is also within the scope of this invention to form the closure and neck portion with any conventional complementary locking means for securing the closure to the container.

From the foregoing, it will be seen that novel and advantageous provision has been made for carrying out the desired end. However, attention is again directed to the fact that variations may be made in the example method and article disclosed herein without departing from the spirit and scope of the invention as defined in the appended claims.

I claim:

1. A method of producing a multi-wall container comprising the steps of forming at least a pair of coaxial telescopic tubular members, contouring a portion of one of the members to form a closure portion and simultaneously contouring a portion of the other of the members to form a complementary contured neck portion in generally telescopic relationship with said closure portion, simultaneously forming complementary locking portions in each of the closure and neck portions during the contouring thereof, and removing the closure portion from the remainder of the one member whereby the closure portion is adapted for reapplication upon the neck portion of the other member by the respective disengagement and re-engagement of the locking portions.

2. The method of producing a multi-wall container as defined in claim 1 wherein the tubular members initially each have axially opposite closed ends and further including the step of forming an opening in an end wall portion of both the closure and neck portions whereby the opening in the latter portion defines a mouth of the multi-wall container.

3. The method of producing a multi-wall container as defined in claim 2 including the step of closing the opening in the closure portion to complete the formation thereof.

4. A method of producing a multi-wall container comprising the steps of simultaneously extruding at least a pair of coaxial telescopic tubular members, contouring a portion of one of the members to form a closure portion and simultaneously contouring a portion of the other of the members to form a complementary contoured neck portion in generally telescopic relationship with said closure portion, performing the simultaneous contouring of said portions by confining the members in a mold and expanding the members to the configuration of the mold, and removing the closure portion from the remainder of the one member whereby the closure portion is adapted for reapplication upon the neck portion of the other member.

5. The method of producing a multi-wall container as defined in claim 4 wherein the tubular members each have axially opposite closed ends whereby upon the expansion thereof said neck portion is closed by an end wall of the innermost of said members.

6. The method of producing a multi-wall container as defined in claim 4 wherein the closure portion is removed from the remainder of the one member by peripherally severing the closure portion whereby the severed closure portion is rendered removable from and adapted for subsequent reapplication to the neck portion.

7. The method of producing a multi-wall container as defined in claim 4 including the steps of forming an opening in at least an end portion of the closure portion, and subsequently closing the opening in the end portion.

8. The method of producing a multi-wall container as defined in claim 4 including the step of forming an opening in an end wall of the closure portion and the end wall of the neck portion whereby the opening in the latter portion defines a mouth of the multi-wall container.

9. The method of producing a multi-wall container as defined in claim 4 wherein the tubular members possessing formed from the stronger tubular member and the neck portion being formed from the weaker tubular member.

References Cited

UNITED STATES PATENTS

| | | | |
|---|---|---|---|
| 2,856,632 | 10/1958 | Rekettye | 264—154 |
| 2,991,500 | 7/1961 | Hagen | 264—98 |
| 3,021,559 | 2/1962 | Strong | 264—96 |
| 3,198,375 | 8/1965 | Hunter | 264—98 |
| 3,214,830 | 11/1965 | Piker | 264—94 |
| 3,251,915 | 5/1966 | Pechthola | 264—94 |
| 2,390,291 | 12/1945 | Blackman | 215—42 |
| 3,133,661 | 5/1964 | Schurman et al. | 215—38 |
| 3,189,208 | 6/1965 | Jowitt | 215—38 |

FOREIGN PATENTS

| | | |
|---|---|---|
| 603,517 | 8/1960 | Canada. |
| 645,454 | 9/1962 | Italy. |

ROBERT F. WHITE, *Primary Examiner.*

A. R. NOE, *Assistant Examiner.*